Feb. 21, 1928.

L. W. CLAYBOURN 1,660,069

PRINTING MACHINERY

Filed May 3, 1926    12 Sheets-Sheet 2

INVENTOR.
Leslie W. Claybourn,
BY
ATTORNEY.

Feb. 21, 1928.

L. W. CLAYBOURN

PRINTING MACHINERY

Filed May 3, 1926

INVENTOR.
Leslie W. Claybourn,
BY
ATTORNEY.

Feb. 21, 1928.
L. W. CLAYBOURN
1,660,069
PRINTING MACHINERY
Filed May 3, 1926 12 Sheets-Sheet 4
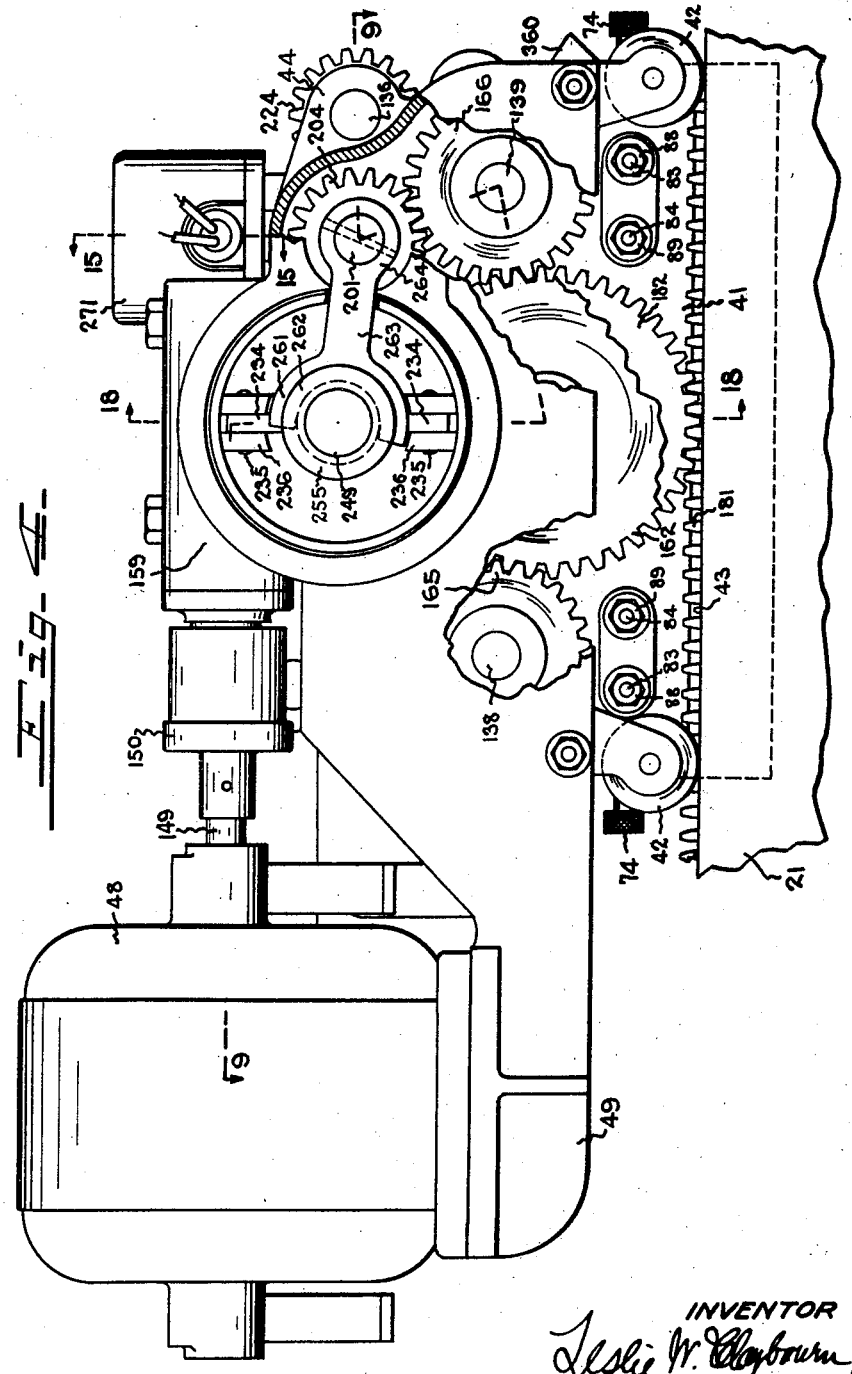
INVENTOR
Leslie W. Claybourn,
BY
ATTORNEY

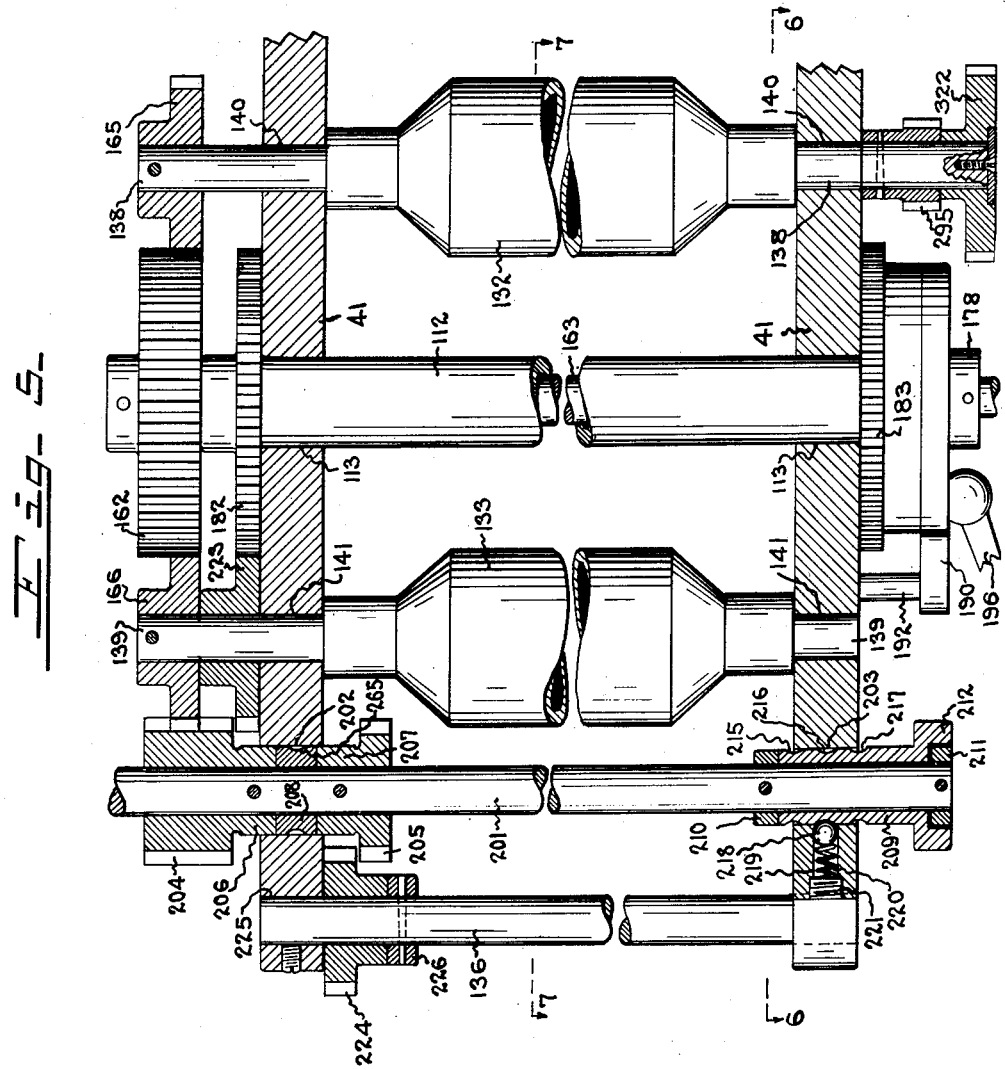

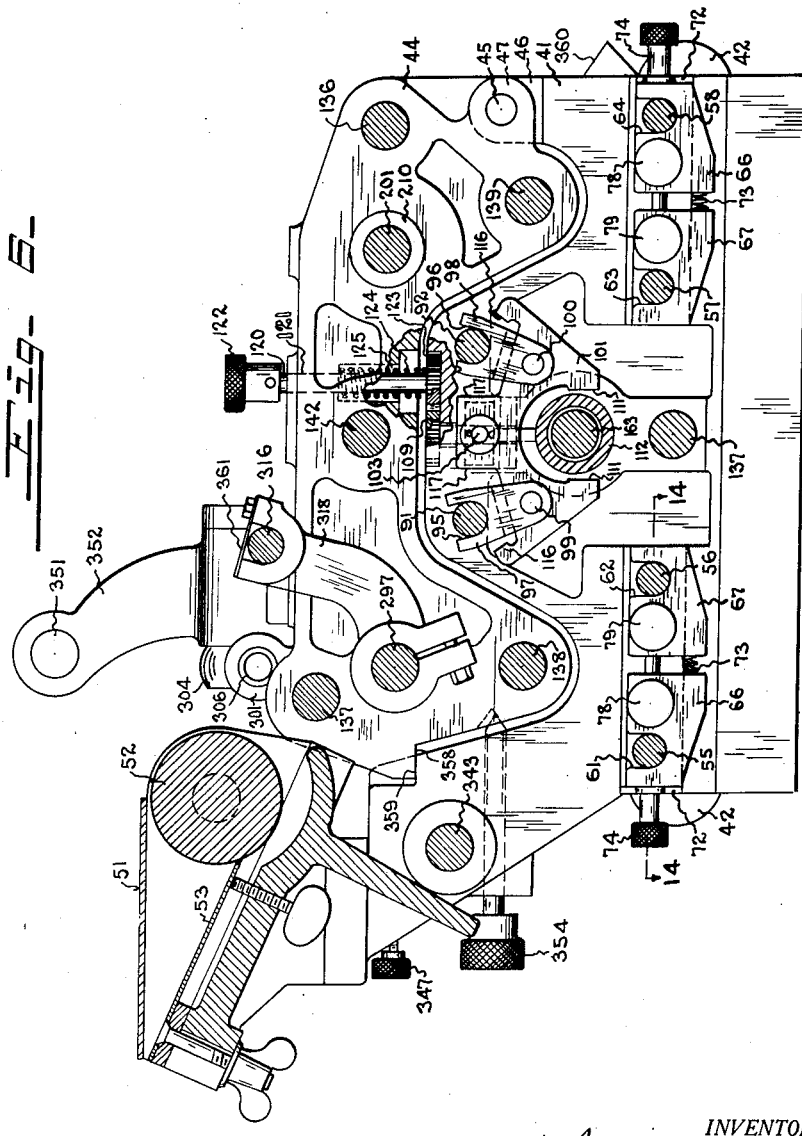

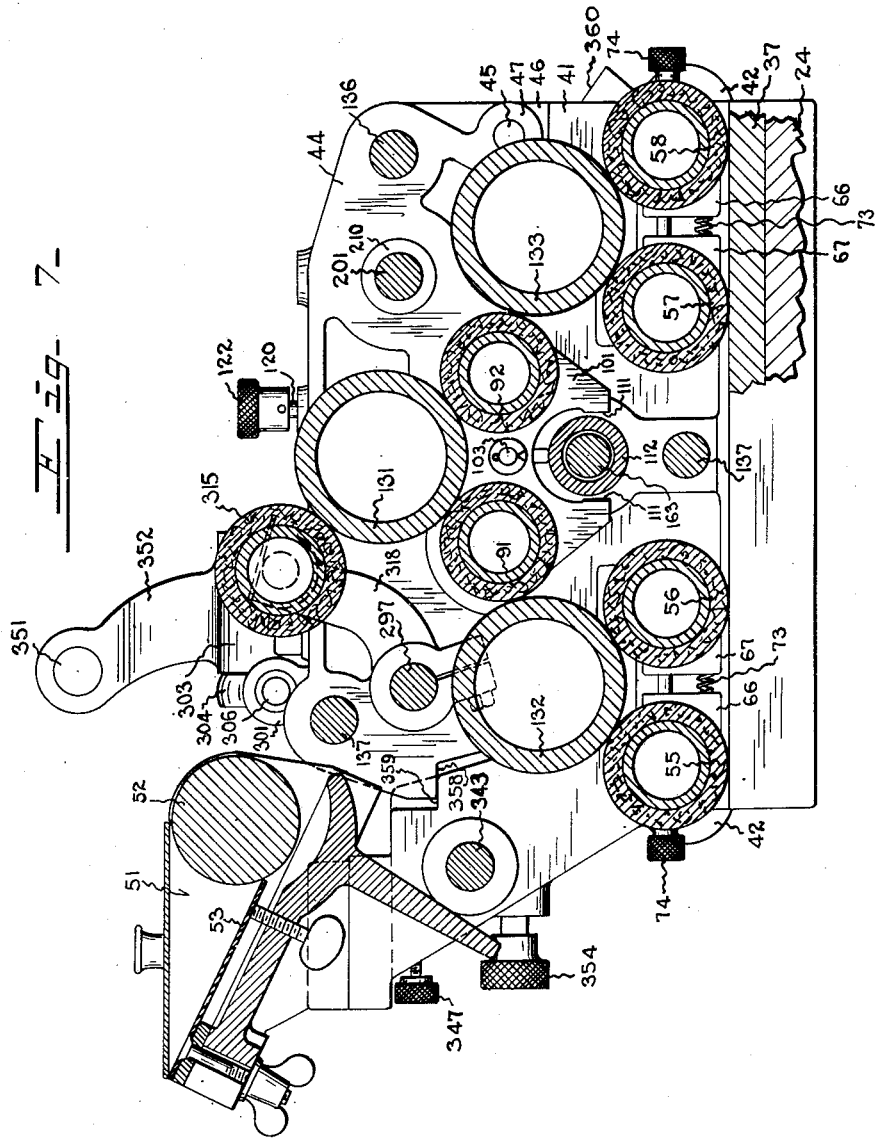

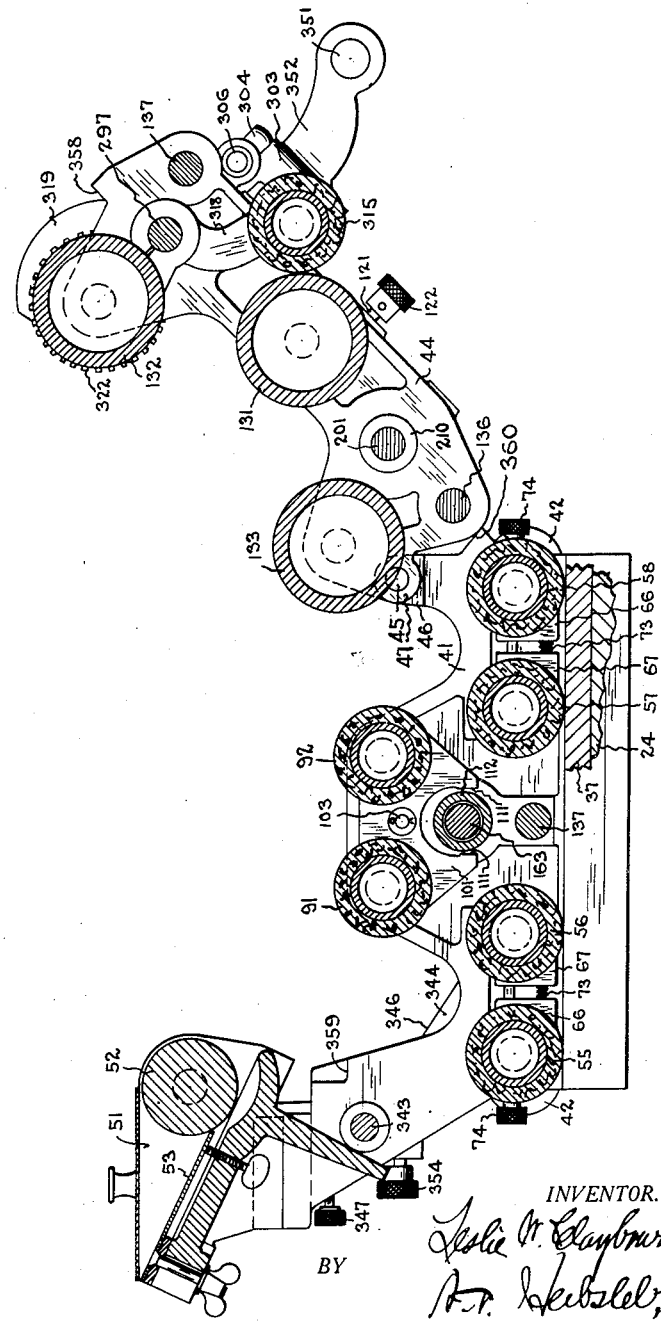

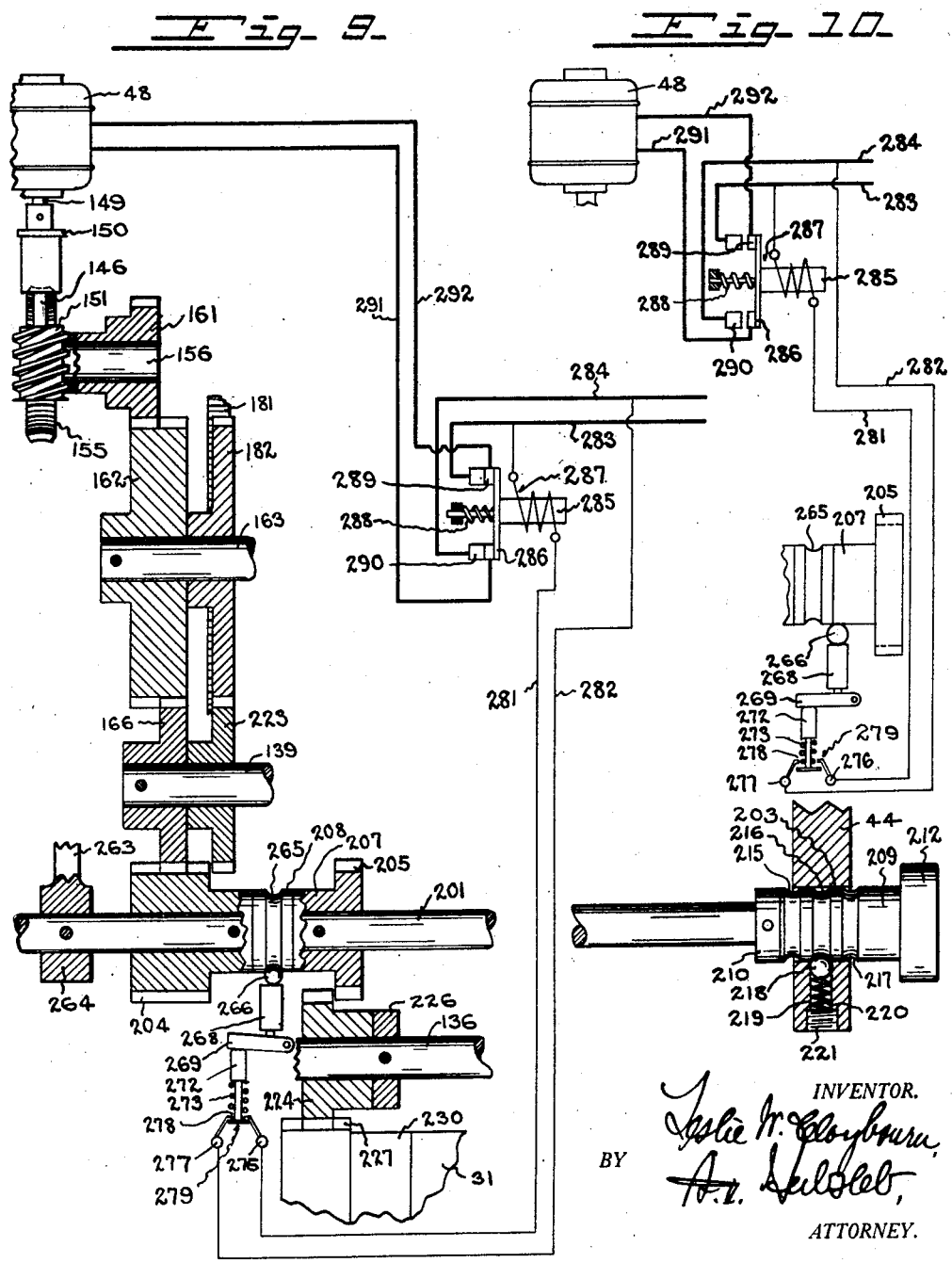

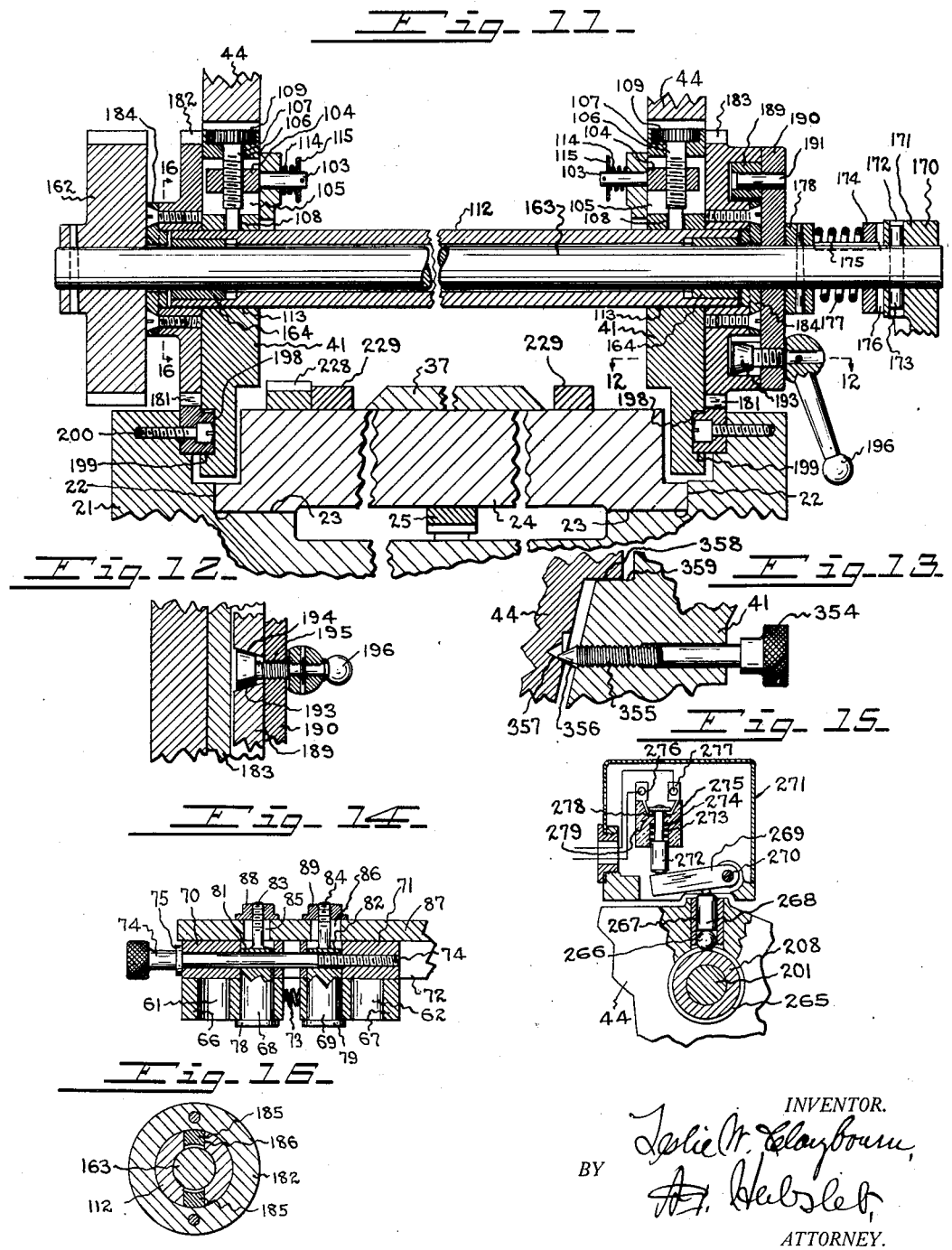

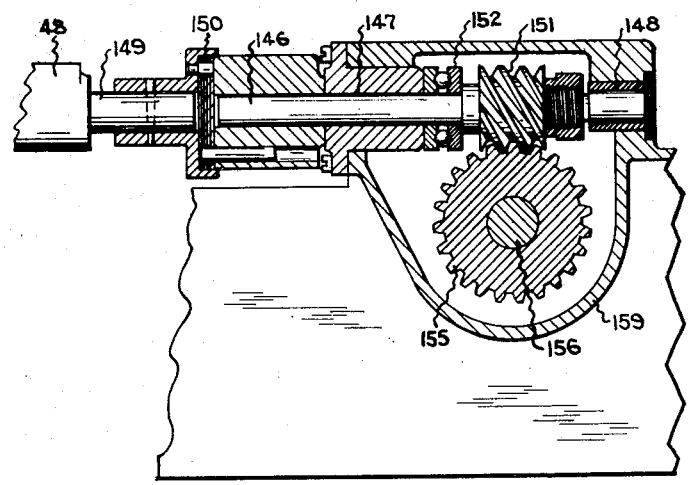

Feb. 21, 1928. 1,660,069
L. W. CLAYBOURN
PRINTING MACHINERY
Filed May 3, 1926 12 Sheets-Sheet 12

INVENTOR.
Leslie W. Claybourn,
BY
ATTORNEY.

Patented Feb. 21, 1928.

1,660,069

UNITED STATES PATENT OFFICE.

LESLIE W. CLAYBOURN, OF MILWAUKEE, WISCONSIN.

PRINTING MACHINERY.

Application filed May 3, 1926. Serial No. 106,197.

My invention relates to improvements in printing machinery, and is especially applicable in so-called proof presses.

It is the object of my invention to provide a printing machine with inking mechanism and means whereby to cause travel of the inking mechanism lengthwise of the path of the reciprocating bed concerned in the printing, and means whereby to locate the inking mechanism adjacent to a rotary tympan; further, to provide an inker carriage with a motor arranged to rotate the inking rollers; further, to provide novel means whereby to rotate the inking rollers by connection with the rotary tympan cylinder or by connection with the reciprocating bed of the printing couple; and, further, to provide manual means and connections therefor for selectively rotating the inking rollers, or simultaneously causing reciprocation of the reciprocating bed and rotation of the inking rollers.

It is the object of my invention further to provide an inking roller containing carriage with a motor mounted thereon for rotating the inking rollers, and manual means on said carriage for rotating inking rollers and for causing lengthwise travel of the inker carriage and rotation of the inking rollers; and to provide novel means for controlling a movable element in said train of mechanism and an electric switch or translating device and operative relations between the same for securing selectively in hand operation or in motor operation, and insuring non-interference of one with the other.

It is the object of my invention further to provide inking mechanism with a relatively stationary roller supporting frame and a relatively pivoted roller supporting frame so arranged that the rocking of the latter will cause exposure of the inking rollers for ready access for cleaning and other purposes; further, to provide such inking mechanism with the inking rollers so related that the movable inking rollers are arranged to be swung at one end of the series of inking rollers so as to expose the inner portions of the pivoted frame and of the relatively stationary frame for exposing the coacting faces of the inking rollers.

It is the object of my invention, further, to provide an inking mechanism comprising a pivoted frame in which the relatively hard distributer rollers are located and a relatively stationary frame in which the composition distributing rollers and the form rollers are located; further, to provide novel means for adjusting the composition distributing rollers with relation to a series of relatively hard distributing rollers; further, to provide novel adjusting means for the form rollers; further, to provide novel adjusting means for adjusting an inking roller in the relatively stationary frame of the inking mechanism comprising an operating part on the pivoted frame and a yieldable releasable connection between the latter and adjusting means on the relatively stationary frame; and, further, to provide novel means for operative relation between the pivoted frame and the stationary frame.

It is the object of my invention further to provide novel means for operating a ductor roller; further, to provide novel means for operating the fountain roller; further, to provide novel means whereby such operating means or a part thereof is located on the pivoted frame; further, to provide novel means for causing reciprocation of a distributing roller; and, further, to provide novel means for associating such mechanisms.

My invention will be further readily understood from the following description and claims, and from the drawings, in which latter:

Fig. 4 is a rear side elevation of the same, partly broken away, and with the cover of the clutch housing removed.

Fig. 5 is a plan section, partly laid out in plane, taken in the plane of the irregular line 5—5 of Fig. 3, showing some of the gearing.

Fig. 6 is a longitudinal vertical section, taken in the plane of the line 6—6 of Fig. 5.

Fig. 7 is a similar section, taken in the plane of the section line 7—7 of Fig. 5, showing the pivoted inker frame in down position.

Fig. 8 is a similar section, but showing the pivoted inker frame in raised position, or thrown back.

Fig. 9 is a plan section of the driving gearing for the inking rollers and for travel of the carriage, taken on the irregular line 9—9 of Fig. 4, showing the gearing laid out in plane, and a diagrammatic representation of the electric connections for the inking motor, shown in connection therewith, the electric connections showing an electrically energized condition of the motor.

Fig. 10 is a diagrammatic representation of the electrical connections for the motor, for idle relation of the latter.

Fig. 11 is a vertical axial section, taken in the plane of the line 11—11 of Fig. 3, showing connecting means and releasing means for the manual operation and for lengthwise travel of the carriage, and details of roller adjusting means.

Fig. 12 is a detail of the clutch mechanism for lengthwise travel of the carriage, taken in the plane of the line 12—12 of Fig. 11.

Fig. 13 is a vertical section of a detail, showing the means for clampingly connecting the pivoted frame with the relatively stationary frame of the inking mechanism.

Fig. 14 is a horizontal section of a detail, taken on the line 14—14 of Fig. 6, showing the means for adjusting the form rollers.

Fig. 15 is a cross-sectional detail of the switch mechanism for the inker motor, taken in the plane of the line 15—15 of Fig. 4.

Fig. 16 is a cross-sectional detail taken on the line 16—16 of Fig. 11.

Fig. 17 is a vertical axial section of the drive mechanism for the inker motor, taken in the plane of the line 17—17 of Fig. 18.

Fig. 18 is a vertical axial section of the clutch mechanism for the motor drive, taken in the plane of the line 18—18 of Fig. 4.

Figure 1:
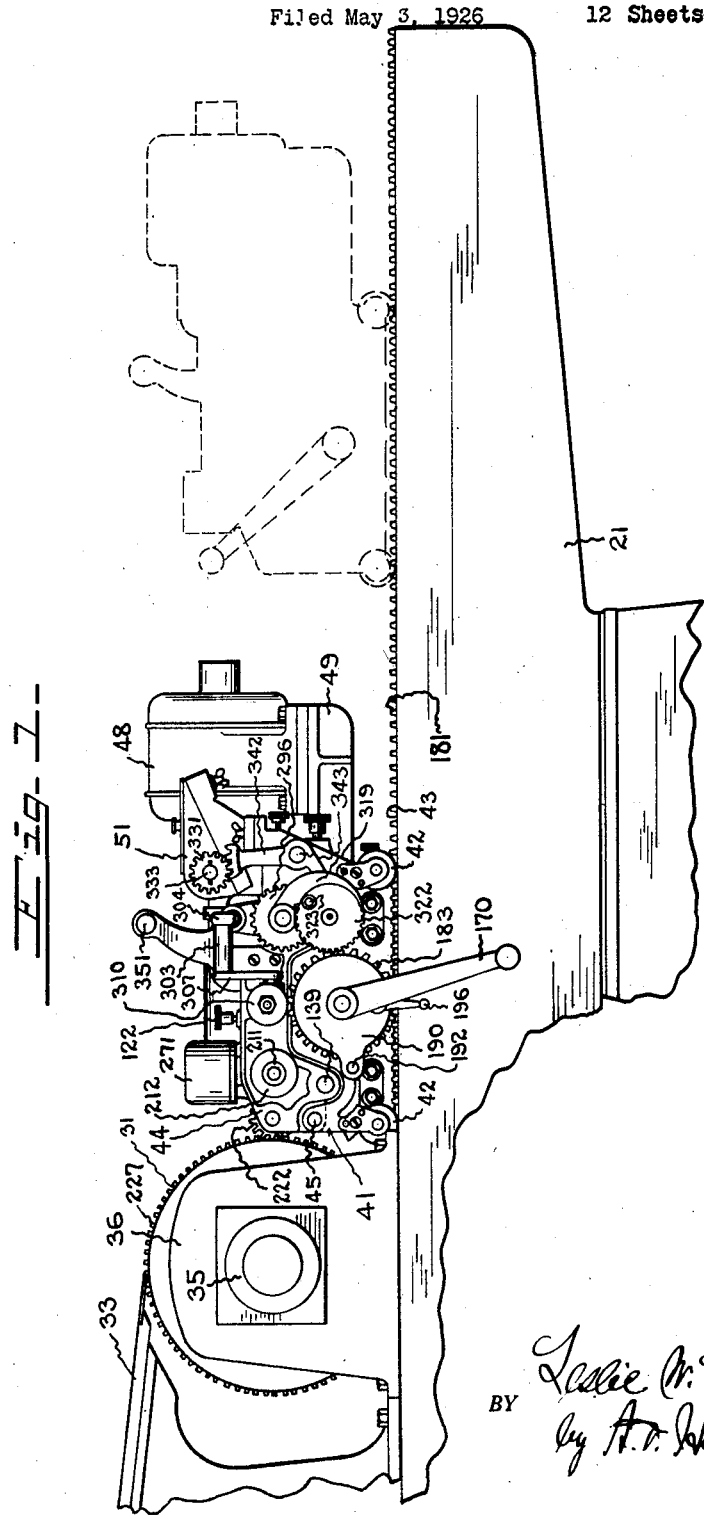
Fig. 1 is a side elevation of my improved device, partly broken away, showing the inking mechanism in adjacency to the rotary tympan cylinder in full lines, and in distanced relation thereto in dotted lines.

A suitable frame 21 is provided with guideways 22, 23, in which a bed 24 moves back and forth. (See Figs. 1, 2 and 11.) The bed is provided with a rack 25 with which a driving pinion 26 engages, the driving pinion being suitably operated, as by an electric motor 27. Suitable means are provided for arresting the bed in a predetermined position at each reciprocating movement thereof, which need not be herein further described. An exemplification of such means is shown, described and claimed in my copending application for patent on improvements in printing machinery, Serial No. 106,196, filed May 3, 1926.

A rotatable tympan cylinder 31 provided with grippers 32 is arranged to receive the paper from a feed-board 33, the paper being suitably positioned and held by means not herein more particularly shown or described, and means being provided for approach and recession between the cylinder and the bed in timed relations to the reciprocations of the bed, not herein shown or described, an exemplification of which is fully shown, described and claimed in my aforesaid application. The axles of the tympan cylinder are shown mounted in bearings 35 in standards 36 extending from the sides of the main frame.

The form which it is desired to prove, shown at 37, is laid upon the bed and suitably positioned, as against a positioning bar 38, and is caused to reciprocate with the bed.

An inking mechanism comprises an inker frame or carriage provided with a relatively stationary frame 41, and is provided with supporting rollers 42 movable along the main frame on guideways 43, toward and from the tympan cylinder. A pivoted frame 44 is exemplified as pivoted by pivot pins 45 at one of the ends of the pivoted frame to one of the ends of the relatively stationary frame, the pivot pins being located in bearings 46, 47, respectively in the relatively stationary frame and in the pivoted frame. An electric motor 48 is secured on a bracket 49 on the relatively stationary frame.

An ink fountain 51 is mounted on the relatively stationary frame and is provided with a fountain roller 52 and an adjustable bottom 53 adjustable with relation to the fountain roller in suitable manner. (See Figs. 1, 2, 3, 6, 7 and 8.)

Form inking rollers 55, 56, 57, 58, are arranged in pairs, and are composition rollers which are arranged to directly apply the ink to the printing surfaces of the form located on the bed. These form rollers are provided with axles at their respective ends, which are journaled in bearings 61, 62, and 63, 64. (See Figs. 6, 7, 8, 14.) These bearings are open-ended at their tops so that the form rollers may be readily removed and inserted.

The bearings of the respective pairs of bearings are located in pivot blocks 66, 67, pivoted on trunnions 68, 69, in slides 70, 71, slidable on guideways 72 in the relatively stationary frame. A spring 73 normally urges separation between said slides and swinging movement of said pivot blocks about said trunnions. An adjusting screw 74 is threaded in the slide 71 and is journaled in the slide 70, separation between the slides being prevented by the threaded connection with the slide 71 and the shoulder 75 on the adjusting screw coacting with the slide 70. The adjusting screw causes relative movement between said slides in one direction, and the spring urges relative movement between said slides in the opposite direction.

The trunnions 68, 69, are provided with shoulders 78, 79, and have apertures 81, 82, therethrough, through which the adjusting bolt 74 is received. These trunnions are provided with clamp-bolts 83, 84, movable in slots 85, 86, in the wall 87 of the guideway 72, clamp-nuts 88, 89, being arranged to clamp the bolts in adjusted positions for clamping the bearing-blocks and the slides to the relatively stationary frame. (See Figs. 6 and 14.)

The construction just described permits adjustment of the form rollers with relation to the printing face of the printing form on the bed and with relation to the relatively hard distributing rollers hereinafter described coacting with said form rollers, the parts being clamped in adjusted positions after adjustment. Either or both form rollers may be adjusted. If it is desired to adjust only one form roller, the clamp for the other form roller is permitted to remain clamped.

A pair of composition distributing rollers 91, 92, are provided with axles at their respective ends, journaled in bearings 95, 96, on pivot arms 97, 98, pivoted on pins 99, 100, on a support 101, shown as a slide guided by the inside face of the side frames of the relatively stationary frame, and pivoted on a pin 103 extending from a block 104, adjustable up and down in a cavity 105 of said side frame, which block is threaded and has an adjusting screw 106 threaded therein. The adjusting screw is journaled in bearings 107, 108, in the side frame, and has a pinion 109 fixed thereto. Excess pivotal movement of the support is prevented by contact faces 111 thereon, arranged to engage a sleeve 112, which extends across the relatively stationary frame, and is journaled in bearings 113 in the side frames. (See Figs. 6, 7, 8 and 11.) The pivoted support is held toward the side frame by a spring 114 between a washer 115 on the pivot pin 103 and said slide.

Swinging movement of the bearing arms 97, 98, is limited in outward direction by lugs 116 and in inward direction by the contact faces 117 on the support.

Adjustment of these distributing rollers is accomplished by an adjusting shaft 120 journaled in a bearing 121, and provided with a knob 122 and having a pinion 123 fixed thereto. This pinion meshes with the pinion 109, and is releasably held toward the plane of said last-named pinion by a spring 124, which surrounds said shaft and is located in a socket 125 in the pivoted frame, between the end wall of said socket and said pinion. (See Figs. 6 and 7.)

The adjusting means for the composition distributing rollers are thus mounted on the relatively stationary frame, and the operating means for said adjustments are mounted on the pivoted frame, and there is releasable and yieldable connection between the same, the pinion 123 moving with the pivoted frame. When the pivoted frame is swung into coactive relation with the relatively stationary frame, the pinion 123 is again moved into mesh with the pinion 109, but if there should be clashing between the teeth of said pinions when the pivoted frame is swung into place, the pinion 123 will yield so as to enable the pivoted frame to be secured in place without reference to the pinions, the pinions coming into mesh upon rotation of either one of the same.

Distributing rollers 131, 132 and 133, are mounted on and move with the pivoted frame. These distributing rollers are exemplified as relatively hard rollers. The distributing roller 131 coacts with the pair of distributing rollers 91, 92, and the distributing rollers 132, 133, coact respectively with the pairs of form rollers 55, 56, and 57, 58, and with the respective distributing rollers 91, 92. (See Figs. 6, 7 and 8.)

The pivoted frame comprises side frames which are rigidly connected by tie-rods 136, 137.

Figure 19:
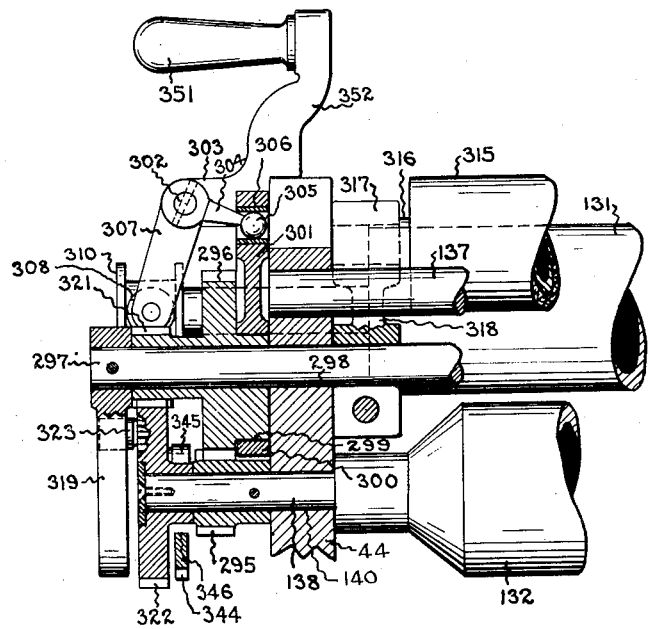
Fig. 19 is a vertical section of the vibrating mechanism for the vibrating distributing roller, taken on the line 19—19 of Fig. 3.
Figure 20:
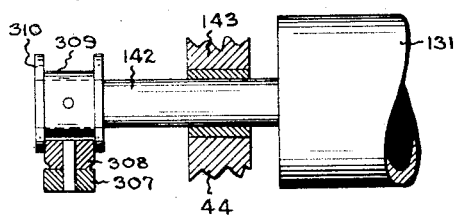
Fig. 20 is a horizontal sectional detail of the same, taken in the plane of the line 20—20 of Fig. 3; and, Fig. 21 is a vertical axial section of a detail of the operating means for the ductor-roll, taken on the line 21—21 of Fig. 3.

The distributing rollers 132, 133 are provided with axles 138, 139, journaled respectively in bearings 140, 141, in the side frames. (See Figs. 5 and 19.) The distributing roller 131 is provided with an axle 142 journaled in bearings 143 in the side frames. This distributing roller is exemplified as an endwise reciprocating roller. (See Fig. 20.)

The composition distributing roller 91 coacts with the relatively hard distributing rollers 131, 132, and the composition distributing roller 92 coacts with relatively hard distributing rollers 131, 133. The adjustment of the support 101, its pivotal mounting, and the pivotal mounting of the distributing rollers 91, 92, cause the composition distributing rollers to automatically assume positions with relation to their coacting distributing rollers for proper ink transfer and distribution between the same, and permits the same to be adjusted for proper contact, the composition distributing rollers automatically assuming their proper contact relations when the pivoted frame is moved into coactive relation with the relatively stationary frame. The mounting of the composition distributing rollers also permits them to move toward each other out of the way of the distributing rollers 132, 133, when the pivoted frame is raised or lowered.

Means are provided for selectively driving the relatively hard distributing rollers by means of the electric motor 48 mounted on the inker frame, by manual means, and by means of the tympan cylinder, the manual operating part also having connection with means for selectively moving the inker frame lengthwise of the main frame in association with rotation of the inker rollers. The control means for the motor are associated with the control means for said various operations, so that the electric motor circuit is closed for motor operation at one position of said control means, intended for motor operation of the inking rollers, and said electric motor circuit is open for idle relation of the motor during the times that said inking rollers are connected for operation by the tympan cylinder, for manual operation, or for manual operation in connection with travel of the inker frame.

The means exemplified for accomplishing these purposes comprise a shaft 146, journaled in bearings 147, 148, on the inker frame, and connected with the rotor 149 of the electric motor 48 by means of a flexible coupling 150. A worm 151 is fixed to the shaft 146, the shaft also being provided with an end thrust bearing 152. The worm 151 meshes with a worm-wheel 155, journaled on a shaft 156, journaled in bearings 157, 158, respectively in a clutch casing 159 and a removable cover 160 thereof. (See Figs. 2, 4, 9, 17 and 18.)

The shaft 156 has a pinion 161 fixed thereto. The pinion 161 meshes with a gear 162. (See Figs. 4, 5, 9, 11 and 18.) The gear 162 is fixed to a shaft 163, which is located in the sleeve 112, being journaled in bushings 164 in said sleeve, and extends across the inker frame, being located in the relatively stationary frame thereof. The gear 162 meshes with gears 165, 166, respectively fixed to the axles 138, 139, of the distributing rollers 132, 133. The distributing roller 131 is rotated by the friction contact with the distributing rollers 91, 92, in turn rotated by friction contact with the distributing rollers 132, 133.

The shaft 163 also has thereon a manual operating handle 170. This handle is releasable from the shaft and preferably removable, accomplished by providing the operating handle with a hub 171 provided with a bore received over the end of the shaft, the inner end of the hub being provided with a bayonet slot 172 arranged to be received about a pin 173 fixed in said shaft, for causing operative connection between the handle and said shaft. A collar 174 has spline key and groove connection 175 with said shaft, and is provided with a slot 176 arranged to be received about said pin. A spring 177 about said shaft between said collar 174 and a collar 178 fixed to said shaft, normally urges the collar 174 toward said pin so as to encompass said pin when the operating handle is removed. (See Fig. 11.)

If it is desired to use the operating handle, the operator pushes the hub manually inward and rotates the same, for engagement with the pin, in order that connection may be made with the shaft for rotating the shaft manually. (See Figs. 1, 2, 3 and 11.)

The means for causing lengthwise travel of the inker carriage on the main frame lengthwise of the path of the reciprocating bed, include toothed racks 181, secured to the respective sides of the main frame. Gears 182, 183, mesh with these racks.

The gear 182 is operatively connected with the sleeve 112, as by being provided with a cap 184 fixed thereto, which has thereon teeth 185 received in tooth spaces 186 in the end of the sleeve, there being a pair of these teeth and tooth spaces. (See Figs. 11 and 16). The gear 183 is similarly connected with the sleeve by similar parts identified by the same reference numerals.

Means are provided for preventing rotation of the gear 183 in order to position the inker frame in coactive relation with the tympan cylinder or in selective positions lengthwise of the main frame. This is accomplished by means of a friction clutch, comprising a friction ring 189, held to a plate 190 by means of a pin 191. (See Figs. 11 and 12). This plate is fixed to the relatively stationary frame of the inker frame by a pin 192. A conical cam 193 is received between the sloping ends 194 of the split friction ring. The cam has a threaded shank 195, arranged to be rotated by a handle 196, so as to move the cam endwise for friction engagement or release of the friction ring with the gear 183. When the friction ring is clamped, the inker frame is held stationary by reason of the meshing between the gears 182, 183, and the racks 181. When said friction clutch is released, travel of the inker frame on the main frame is permitted, the simultaneous rotation of the gears also providing equalization between the respective sides of the inker frame and its guideways.

The respective side walls of the inker frame are provided with the guideways 198, coacting with guideways 199, shown as part of the racks 181, and secured to the sides of the main frame by screws 200. (See Fig. 11).

A control shaft 201 is movable axially in bearings 202, 203, of the pivoted frame 44. It has an elongated pinion 204 and a pinion 205 fixed thereto. These pinions have hubs 206, 207, between which there is a collar 208, the hubs and collar being endwise slidable in the bearing 202. This shaft also has a sleeve 209 loose thereabout and held endwise between collars 210, 211, fixed to said shaft. The last-named sleeve has a knob 212 thereon, and is located in the bearing 203. (See Fig. 5).

The sleeve 209 has annular grooves 215, 216, 217, therein, corresponding respectively to the positions of endwise manipulations of the shaft 201. A positioning ball 218 is located in a bore 219 in the side wall of the pivoted frame and is urged into the annular slot registering therewith by a spring 220 held in said bore by a threaded plug 221.

A pinion 223 rotates loosely about the axle 139 and meshes with the gear 182, which in turn meshes with the rack 181. A pinion 224 rotates loosely about the tie-rod 136, fixed in bearings 225 in the pivoted frame. This pinion is held endwise between one of said bearings and a collar 226 fixed to said tie-rod. This pinion 224 is arranged to mesh with the tympan gear 227 on the tympan cylinder when the inker frame is moved for coactive relation with the tympan cylinder. The tympan cylinder in turn meshes with a rack 228 fixed to the reciprocating bed, so as to insure coactive reciprocation of the bed and reverse rotations of the tympan cylinder, the printing movements between the bed and tympan cylinder being, however, controlled by coaction between the bearers 229 on the bed and the bearers 230 on the tympan cylinder. (See Figs. 1, 2, 3, 4, 5, 9 and 11).

The meshing relation between the gear 204 and the gear 166 is continuous throughout the endwise adjustments of the control shaft 201. In the relation of the parts exemplified in Fig. 5, the parts are adjusted for rotation of the inking rollers by means of the electric motor mounted on the inker frame. Endwise movement of the control shaft in one direction, to the right as shown in said figure, also causes engagement of the gear 204 with the gear 223. In this relation the parts are adjusted for rotation of the inking rollers by means of the handle 170, the rotation of the handle also moving the inker carriage lengthwise of the main frame by reason of the meshing relation between the pinion 223 and the gear 182, it being understood that the clamp handle 196 has been operated for release of the clutch 189. This endwise movement of the operating shaft also disengages the motor clutch to be presently described for disengaging the drive of the electric motor from the inking rollers, and also deenergizes said motor in manner to be presently described.

Endwise movement of the control shaft in the opposite direction causes meshing engagement between the pinion 205 and the pinion 224. This endwise movement of the control shaft also causes disengagement in the motor clutch and the deenergizing of the motor in manner to be presently described.

When the parts are in this relation, and the pinion 224 is in mesh with the tympan cylinder gear 227, and the handle 196 is operated for engagement of the clutch 189, for fixing the position of the inker carriage adjacent to the tympan cylinder, the parts are related for rotation of the inking rollers by means of the tympan cylinder.

If, however, the pinions 205, 224, are in mesh, and the inker frame has been previously positioned away from the tympan cylinder, the inking rollers may be rotated by means of the operating handle 170.

The means exemplified for connecting and disconnecting the inker motor comprises a clutch 231, comprising a cup member 232 fast with the worm-wheel 155 and a cone member 233. (See Figs. 4 and 18). Levers 234 are pivoted by pins 235 to lugs 236 on the cone member. Said levers are also pivoted by fulcrum pins 237 to fulcrum lugs 238 on a fulcrum collar 239 surrounding an enlarged part 240 of the shaft 156.

A positioning bar 243 is adjustable in a slot 244 in said shaft and has a positioning rod 245 extending therefrom, this positioning rod being located in an axial hole 246 in said shaft. An adjusting screw 247 is adjustable in the threaded portion 248 of said bore and bears against the end of said positioning rod for limiting the outward movement of the positioning bar 243 and consequently of the fulcrum collar 239. The adjusting screw 247 is provided with a knurled head 249. A clamp-nut 250 fixes it in adjusted positions. (See Fig. 18).

A double cone sleeve 255 is slidable axially on the shaft 156, and has a riding face 256 on which the swinging ends of the levers 234 are arranged to ride when the clutch is in engagement. When the cone sleeve is moved in one direction, the outer ends of the levers 234 will move inwardly toward the release face 257, and when said sleeve is moved in the opposite direction, the outer ends of said levers will move inwardly toward the release face 258 of said cone, for releasing said clutch and disengaging operative connection with the electric motor.

The endwise movement of said sleeve is accomplished by means of a fork 261, received in an annular groove 262 in said sleeve, said fork provided with an arm 263 having a hub 264 fixed to the endwise movable control shaft 201. (See Figs. 4 and 18). The electric motor is in drive relation with the inking rollers when the control shaft 201 is in intermediate position, and is out of operative connection with the inking rollers when the control shaft is moved in either endwise relation.

The electric connections for the motor include electric translating devices for energized condition of the motor when the clutch 231 is in engagement, and for deenergized condition of the electric motor when said clutch is in disengaged relation, by endwise movement of the control shaft 201 to extreme endwise relation in either direction. For accomplishing this the collar 208 on the control shaft is exemplified as provided with an annular groove 265. (See Figs. 5, 9, 10, 15). A ball 266 coacts with said annular groove and is arranged to move into said annular groove when said annular groove is in registry with said ball, for closing an electric switch, and to be moved outwardly when said annular groove is moved out of registry with said ball in either direction for opening said electric switch.

This ball is shown located in a bore 267 in the pivoted frame, and engages a plug 268, which coacts with a lever 269 pivoted on a pin 270 in a switch-box 271, secured on the pivoted frame 44. (See Figs. 9, 10 and 15). This lever coacts with a stem 272, normally urged toward the lever by a spring 273 in a socket 274 of an insulating block 275, having the terminals 276, 277, thereon, arranged to be contacted by the terminal 278 on said stem, for closing the gap between said first-named terminals, forming an electric switch 279.

This switch is a control switch, and is in a by-pass circuit connected with the main circuit for the motor 48. This by-pass circuit includes electric conductors 281, 282, electrically connected with the respective feed conductors 283, 284, for said electric motor. The electric conductor 281 includes the coil of an electric translating device, shown as a solenoid 285, connected with a movable contact arm 286 of a normally open switch 287. This contact arm is urged into open relation by a spring 288, and has thereon the movable contacts 289 arranged to contact with the contacts 290, shown as terminals for the feed conductors 283, 284. The contacts 289, form terminals for the electric conductors 291, 292, leading to the electric motor. When the switch 279 is closed, the solenoid 285 is energized for closing the main switch 287 and energizing the electric motor. (See Figs. 9 and 10).

This corresponds to a clutched relation in the transmitting clutch 231 for the electric motor, and a relation of the parts such as shown in Figs. 9 and 15. When the switch 279 is open, which is caused by an endwise movement of the operating shaft 201 in either direction from an intermediate position, the solenoid 285 is deenergized, whereby the main switch 287 for the electric motor is opened, corresponding to a relation of parts shown in Fig. 10.

The axle 138 of the distributor roller 132 has a pinion 295 fixed thereto. This pinion meshes with a gear 296, which is rotatable about a rock shaft 297, journaled in bearings 298 in the pivoted frame of the inker carriage. This gear has an eccentric 299 thereon, about which a bearing 300 on a reciprocating arm 301 is received. (See Figs. 3, 5, 19 and 20). A rock-shaft 302 is journaled in a bearing 303 on the pivoted frame and has an arm 304 fixed thereto, this arm having a knob 305 received in an aperture 306 of the reciprocating arm 301. The rock shaft 302 also has an arm 307 fixed thereto, at the swinging end of which there is a roller 308 received in an annular groove 309 of a spool 310, fixed to the end of the axle 142 of the reciprocating distributing roller 131.

A ductor roller 315, which is shown as a composition roller, is arranged to oscillate between the fountain roller 52 and the distributing roller 131. (See Figs. 3, 6, 7, 8 and 19). The ductor roller is provided with axles 316 journaled in bearings 317 of rocker arms 318 fixed to the rock shaft 297. This rock shaft also has a lever 319 fixed thereto. The gear 296 has a pinion 321 fixed thereto, which meshes with a gear 322 rotatable on the axle 138 of the distributing roller 132. (See Figs. 3, 5 and 19).

The gear 322 has a roller 323 thereon, which is arranged to coact with the arcuate face 324 of the rocker lever 319 for moving the ductor roll into coaction with its coacting distributing roller, the latter serving as a feed roller. This arcuate face forms a cam face for the dwelling of said ductor roller on said feed roller. When the actuating roller 323 arrives at the outer end of said rocker lever, the ductor roller is rocked in opposite direction for contact with the fountain roller 52 by means of a spring 325, the respective ends of which are fixed to a lug 326 on the lever 319 and to the bearing 303. The actuating roller 323 has a path between the ends of said arcuate face 324 so as to actuate the rocker lever 319 by rotation of the gear 322 in either direction.

Figure 21:
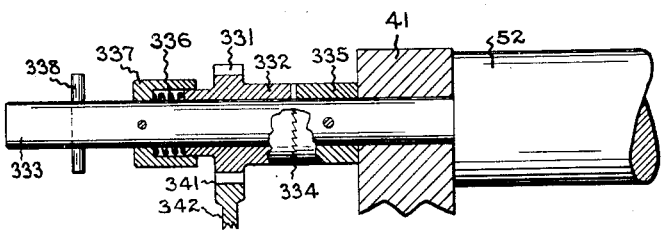

Means are provided for intermittently rotating the fountain roller, exemplified as comprising a pinion 331 on a sleeve 332 rotatable about the axle 333 of the fountain roller, there being a ratchet clutch 334 between said sleeve and a collar 335 fixed to said axle. A spring 336 in a cup 337 fixed to said axle normally urges engagement in said ratchet clutch. The axle may also be provided with a pin 338 to receive a handle for hand rotation of the fountain roller. (See Figs. 3, 19 and 21).

A segment gear 341 on a lever 342 pivoted on a stud shaft 343, on the relatively stationary frame of the inker carriage, is arranged to rotatively reciprocate the pinion 331. The lever 342 is provided with an arm 344 which extends into interfering relation with a roller 345 on the gear 322. This arm has a riding face 346 arranged to be contacted by said roller 345 for moving said arm and thereby rocking the segment lever for rotatively reciprocating the pinion 331.

A set-screw 347 is threaded in a stud 348, extending from the side of the relatively stationary frame of the inker carriage, and is arranged to be contacted by the segment lever. The adjustment of this set-screw regulates the angle of movement of the fountain roller at each reciprocation thereof.

A spring 349 fixed to said stud and having its free end hooked about the segment lever is arranged to normally urge said segment lever into retracted position.

Compact relation of the operating parts for the endwise reciprocating distributing roller, for the ductor roller, and for the fountain roller is thus obtained. (See Figs. 1, 3, 6, 7 and 19). The axes of rotation of the endwise reciprocating roller 131, of the fountain roller 52, and of the distributing roller 132, are in triangular relation, the operating parts therefor being within or adjacent to the triangle thus formed.

A handle 351 on an arm 352 extending from the pivoted frame of the inker carriage is provided for conveniently swinging the pivoted frame into open relation or for engaged relation of the inking rollers.

The pivoted frame is arranged to be clamped to the relatively stationary frame, as by means of a clamp screw 354, at each side of said frames, having threaded connection in a threaded bearing 355 on the relatively stationary frame, and provided with a conical end 356 arranged to contact the lower face of a conical socket 357 in the pivoted frame, for clampingly holding the pivoted frame toward the relatively stationary frame. The pivoted frame is provided with a contact face 358 arranged to be received on a seat 359 on the relatively stationary frame. (See Figs. 3, 6, 7, 8 and 13).

When operating my improved device, if it is desired to provide the inking rollers with their proper film of ink and to properly distribute the ink thereon prior to inking the printing form, the control shaft 201 is placed in intermediate position, exemplified in Figs. 5 and 9, whereby the inking rollers are connected with the inker motor for rotation of said rollers. The motor clutch being engaged in this relation, the inking rollers may be thus rotated whether the inker carriage is at or distanced from the tympan cylinder.

If desired, the inker carriage may be moved away from the tympan cylinder and the control shaft moved endwise, to the left, for disengagement of the motor clutch and deenergizing of the motor, in which relation the inking rollers may be rotated manually by the handle 170.

Figure 2:
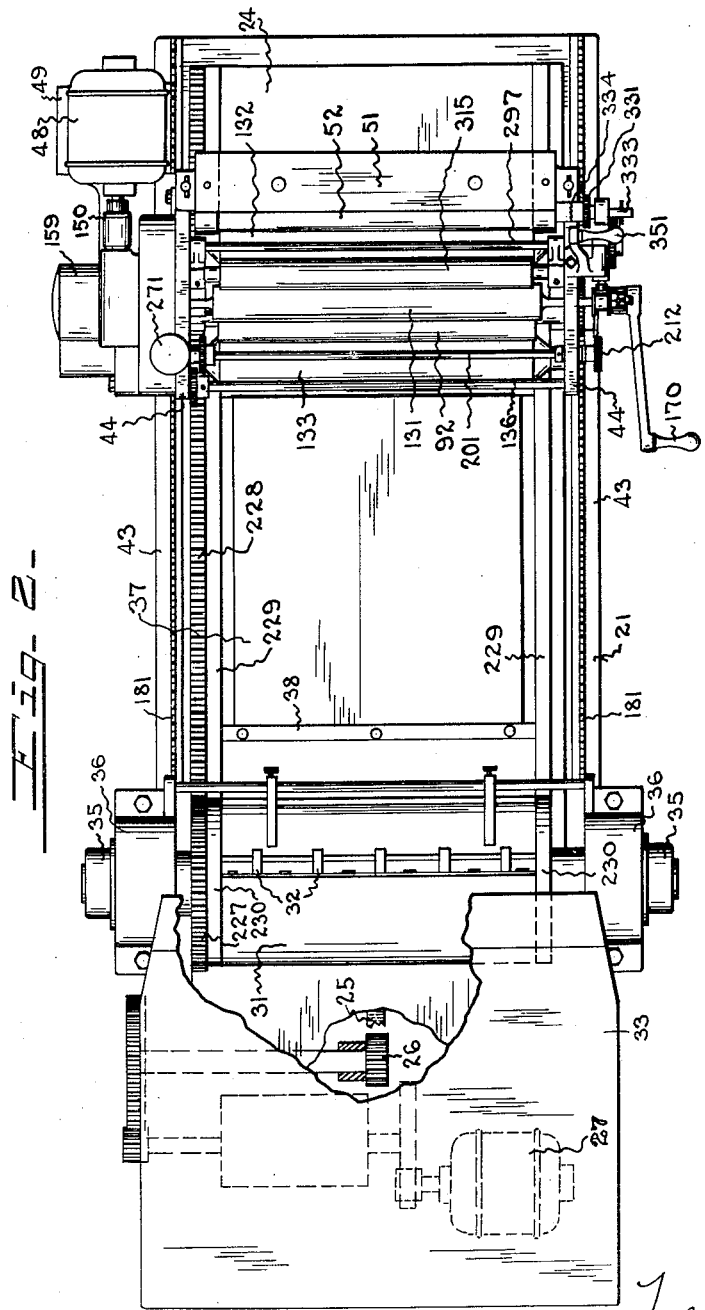
Fig. 2 is a plan view of my improved device, partly broken away, showing the inking mechanism in distanced relation to the tympan cylinder, or rolled back.
Figure 3:
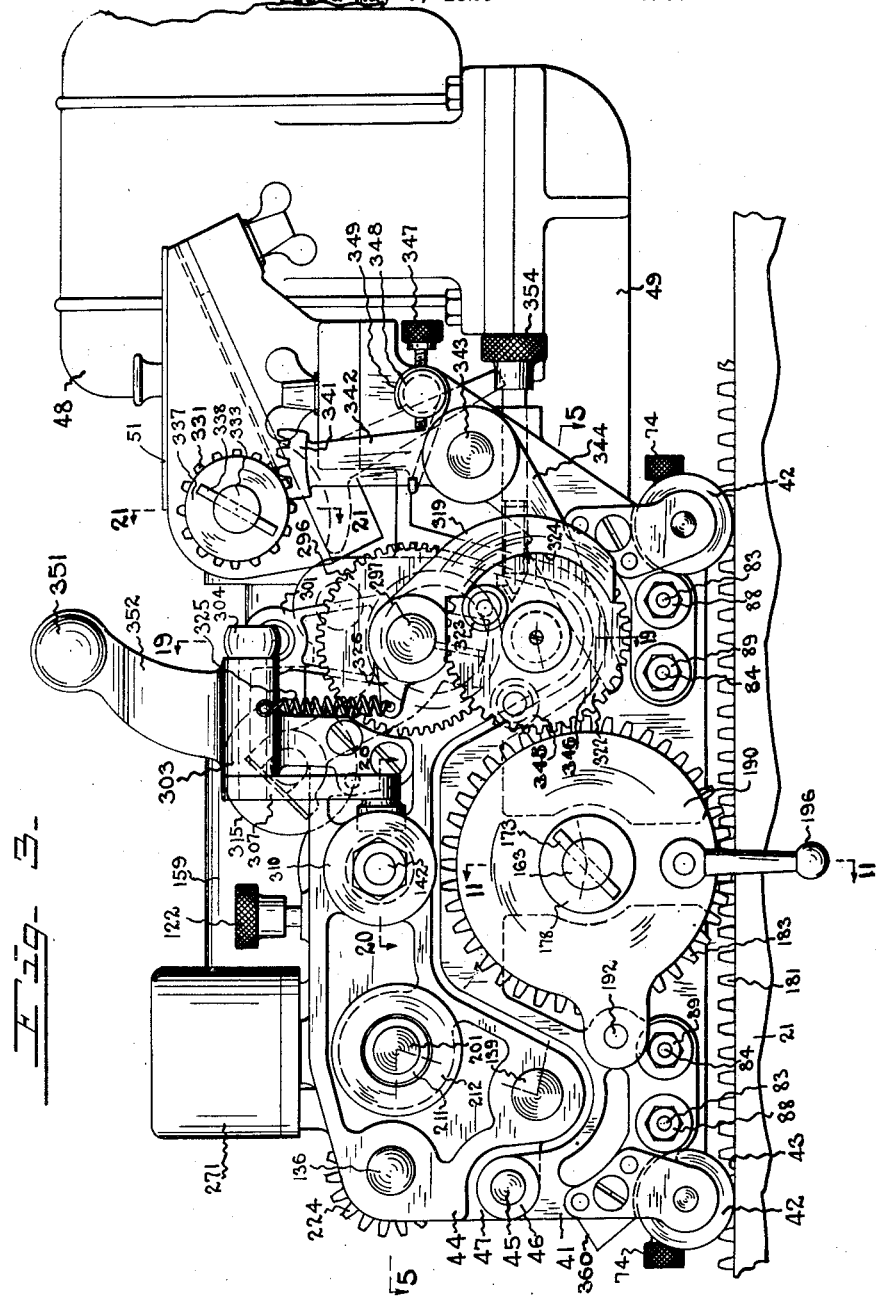
Fig. 3 is a side elevation of the inker frame, viewed from the operator's position, partly broken away.

When thus distributing the ink, the inker frame is preferably moved to its rearmost position, which would be farther to the right than shown in Figs. 1 and 2, in which relation the form rollers would be beyond the plate supporting portion of the bed, or the bed may be moved from under the inking rollers.

It is understood that the form supporting portion of the bed may be moved to that side of the tympan cylinder at which the inker carriage is located, a distance to pass entirely under and beyond the form rollers when the inker carriage is in coactive relation with the tympan cylinder, in one direction of movement of the bed, and that in the other direction of movement of the bed, the form supporting portion of the bed will move and pass entirely under and beyond the lower portion of the tympan cylinder.

It is sometimes desirable, especially in an initial inking of the form, to pass the form rollers repeatedly over the printing surface, which is accomplished in the present case by moving the control shaft endwise to the right, from the position exemplified in Fig. 9 for engaging the pinion 204 with both the gears 166, 223, so as not only to rotate the inking rollers, but also to cause travel of the inker carriage over the form located thereunder, by manual manipulation of the operating handle 170, the friction clutch 189 having been released.

The inker carriage may also be placed in coactive relation with the tympan cylinder, in which relation the pinion 224 is in mesh with the tympan cylinder gear 227, the friction clutch 189 being clamped, whereby the rack gears 182, 183, are locked to the racks 181, so as to maintain fixed relation between the inker carriage and the position of the tympan cylinder. In this relation the bed is caused to reciprocate for passing under the form rollers, which ink the form, and under the tympan cylinder, which prints the sheet received about the tympan cylinder.

The proper contact relation between the inking rollers is obtained by means of the adjustments of the composition distributing rollers and of the form rollers as hereinbefore described.

If it is desired to clean the rollers or give attention to the same, the pivoted frame is swung upwardly so as to expose the contact portions between all of the distributing and form rollers, the pivoted frame resting on stops 360 on the relatively stationary frame. The composition distributing and form rollers are mounted in open ended bearings so as to be readily removed, the ductor roll being also so mounted, but held in its bearings by pivoted strips 361 so as to hold the ductor roll in its bearing when the pivoted frame is swung back.

When the rollers are in place, and the pivoted frame is again swung for connected relation, the composition distributing rollers will automatically find their proper contact relation with the relatively hard distributing rollers, by reason of the movable supports therefor. The pivoted frame is clamped in proper relation with the relatively stationary frame. The connections between the operating part and the adjusting part of the adjusting means for the composition distributing rollers also automatically find their proper mating relations without danger of breakage by the yielding movement provided between the pinions 109, 123. (See Fig. 6).

The operating parts for reciprocating the reciprocating inking roller move with the pivoted frame. A portion of the parts for operating the fountain roller move with the pivoted frame and automatically find their proper relations with the balance of said parts mounted on the relatively stationary frame.

My improved device provides ready and simple means for quickly and economically satisfying the various conditions which are met in the proving of forms, and provides means whereby extreme accuracy in developing conditions of the proved forms is obtained.

Having thus fully described my invention what I claim as new and desire to secure by Letters Patent, is:

1. In a printing machine, the combination of a rotary tympan cylinder, an inker frame, inking rollers mounted therein, means whereby to cause travel of said inker frame toward and from said tympan cylinder, and an electric motor on said inker frame for rotating said inking rollers.

2. In a printing machine, the combination of a rotary tympan cylinder, an inker frame, inking rollers mounted therein, a reciprocating bed coacting with said tympan cylinder, an electric motor on said inker frame for rotating said inking rollers, driving means between said reciprocating bed and said inking rollers for rotating the latter, and means interrupting driving relation between said electric motor and said inking rollers.

3. In a printing machine, the combination of a rotary tympan cylinder, an inker frame, inking rollers mounted therein, a reciprocating bed coacting with said tympan cylinder, gearing causing travel of said inker frame toward and from said tympan cylinder, an electric motor on said inker frame for rotating said inking rollers, driving means between said tympan cylinder and said inking rollers and said gearing, manual operating means on said inker frame for rotating said inking rollers and said gearing, means interrupting driving relation between said electric motor and said inking rollers, means interrupting driving relation between said manual operating means and said gearing, and means interrupting driving relation between said tympan cylinder and said gearing.

4. In a printing machine, the combination of a rotary tympan cylinder, an inker carriage, inking rollers mounted therein, a manual operating part on said inker carriage, a train of means therefrom to cause travel of said inker carriage toward and from said tympan cylinder, an electric motor mounted on said inker carriage, a train of means therefrom for rotating said inking rollers, and means to cause reverse operative relations in said trains of means.

5. In a printing machine, the combination of a rotary tympan cylinder, an inker carriage, inking rollers mounted therein, a manual operating part on said inker carriage, a train of means therefrom to cause travel of said inker carriage toward and from said tympan cylinder, an electric motor mounted on said inker carriage, a train of means therefrom for rotating said inking roller, means to cause reverse operative relations in said trains of means and a train of means between said manual operating part and said inking rollers for rotating said inking rollers.

6. In a printing machine, the combination of a rotary tympan cylinder, an inker carriage, inking rollers mounted therein, a manual operating part on said inker carriage, a train of means therefrom including an interrupting member to cause travel of said inker carriage toward and from said tympan cylinder, an electric motor mounted on said inker carriage, a train of means therefrom including an interrupting member for rotating said inking rollers, a train of means including an interrupting member for operative connection with said tympan cylinder for rotating said inking rollers, means whereby to position said inker carriage for distance relation with said rotary tympan cylinder for controlling said last-named operative connection, and means whereby to selectively shift said interrupting members.

7. In a printing machine, the combination of a rotary tympan cylinder, an inker frame, inking rollers mounted therein, an electric motor mounted on said inker frame, a train of mechanism including a clutch between said electric motor and said inking rollers for rotating said inking rollers, said clutch including a movable member, manual means on said inker frame, a train of mechanism including a movable member between said manual means and said inking rollers for rotating said inking rollers, and means connected with said movable members whereby to cause selective operative positioning of either of said movable members and operative release of the other of said movable members.

8. In a printing machine, the combination of a rotary tympan cylinder, a tympan gear, an inker carriage, inking rollers mounted therein, a gear on said inker carriage coacting with said tympan gear, a movable element connecting said second-named gear with said inking rollers for rotating said inking rollers when said second-named gear is in mesh with said tympan gear, and manual means for rotating said inking rollers when said inker carriage is moved for freedom between said second named gear and said tympan gear.

9. In a printing machine, the combination of a main frame, a reciprocating bed therein, an inker carriage movable on said main frame lengthwise of the path of reciprocation of said bed, inking rollers mounted therein, a transverse sleeve journaled in said carriage, gears rotatable with said sleeve for moving said carriage, a cross-shaft in said sleeve, a gear thereon for rotating said inking rollers, and a manual operating handle for said shaft.

10. In a printing machine, the combination of a main frame, a reciprocating bed therein, an inker carriage traveling on said main frame lengthwise of the path of reciprocation of said bed, inking rollers mounted therein, a transverse sleeve journaled in said carriage, a gear rotatable with said sleeve for travel of said carriage, a cross-shaft in said sleeve, a gear thereon for rotating said inking rollers, and gearing connecting said gears for combined travel of said carriage and rotation of said inking rollers.

11. In a printing machine, the combination of a main frame, a reciprocating bed therein, an inker carriage traveling on said main frame lengthwise of the path of reciprocation of said bed, inking rollers mounted therein, a transverse sleeve journaled in said carriage, a gear rotatable with said sleeve for travel of said carriage, a cross-shaft in said sleeve, a gear thereon for rotating said inking rollers, gearing including a movable member connecting said gears for combined travel of said carriage and rotation of said inking rollers, an electric motor mounted on and movable with said inker carriage, a train of means including a clutch embracing a movable member between said electric motor and said first-named gear, and means shifting said movable members for opposite relations in said gearing and said train of means respectively.

12. In a printing machine, the combination of a main frame, a reciprocating bed therein, toothed racks on said main frame at the respective sides of said reciprocating bed, an inker carriage movable on said main frame lengthwise of the path of reciprocation of said bed, inking rollers mounted therein, a transverse sleeve journaled in said carriage, rack gears at the respective ends of said sleeve coacting with said toothed racks, a cross-shaft in said sleeve, a gear on one end thereof for rotating said inking rollers, a manual operating handle, shiftable connecting means between said operating handle and the other end of said shaft, and locking means between a rack gear and said carriage.

13. In a printing machine, the combination of a rotary tympan cylinder, an inker carriage, inking rollers mounted therein, an electric motor on said inker carriage for rotating said inking rollers, manual means on said inker carriage for rotating said inking rollers and for selectively causing travel of said inker carriage toward and from said tympan cylinder, means on said inker carriage arranged for connection with said tympan cylinder for rotating said inking rollers, and control means for operatively connecting said electric motor with said inking rollers, and for disconnecting said electric motor from said inking rollers when said manual means or said tympan cylinder have operative connection with said inking rollers for rotating said inking rollers.

14. In a printing machine, the combination of a rotary tympan cylinder, an inker carriage, inking rollers mounted therein, manual means for rotating said inking rollers and for causing travel of said inker carriage toward and from said tympan cylinder, an electric motor on said inker carriage for rotating said inking rollers, means connecting with said tympan cylinder for rotating said inking rollers, and control means operatively connecting said electric motor with said inking rollers for rotating the latter, and dissociating said electric motor from said inking rollers and associating said inking rollers with said manual operating means and said tympan cylinder.

15. In a printing machine, the combination of a main frame, a rack thereon, a tympan cylinder journaled in said main frame, an inker carriage, inking rollers mounted therein, a gear for rotating said inking rollers, a gear for coaction with said rack for travel of said carriage, an electric motor mounted on said carriage, a clutch between said electric motor and said first-named gear, a manual operating means on said carriage having operative connection with said first-named gear, a tympan gear, axially movable control gearing arranged to selectively mesh with said first-named gear in an intermediate position; and with said first two named gears, and with said first-named gear and said third-named gear, by movements in opposite axial directions of said control gearing, and means for manually axially shifting said control gearing.

16. In a printing machine, the combination of a rotary tympan cylinder, an inker frame, inking rollers mounted therein, an electric motor, a train of mechanism between said electric motor and said inking rollers for rotating said inking rollers, said train of mechanism including a clutch, an electric switch for said electric motor, and means automatically connecting said clutch and engaging said switch, and disconnecting said clutch and disengaging said switch, in connected relations.

17. In a printing machine, the combination of a rotary tympan cylinder, an inker frame, inking rollers mounted therein, an electric motor, a train of mechanism including a clutch between said electric motor and said inking rollers for rotating said inking rollers, a train of mechanism between said tympan cylinder and said inking rollers for rotating said inking rollers, an electric switch for said electric motor, control gearing for said trains of mechanisms and means for combinedly shifting said control gearing and operating said clutch and said switch.

18. In a printing machine, the combination of a rotary tympan cylinder, an inker carriage, inking rollers mounted therein, an electric motor, gearing including a clutch between said electric motor and said inking rollers for rotating said inking rollers, gearing causing travel of said inker carriage, gearing connecting with said tympan cylinder for rotating said inking rollers, an electric switch for said electric motor, and a shiftable control member for combinedly operating said clutch and said switch for similar relations in both, for associating said motor gearing and said tympan gearing selectively with said inking rollers for rotating the latter, and for connecting said gearing for said inking rollers and said gearing for travel of said inker carriage for combined travel of said inker carriage and rotation of said inking rollers.

19. In a printing machine, the combination of a frame, a rotary tympan cylinder, a bed reciprocating in said frame, a rack moving with the latter, an inker carriage on said frame, inking rollers therein, gearing on said inker carriage meshing with said rack, manual rotating means for rotating said inking rollers and operating said last-named gearing, gearing between said tympan cylinder and said inking rollers for rotating said inking rollers, and a clutch for said first-named gearing arranged to clamp said inker carriage in operative relation with said tympan cylinder.

20. In a printing machine, an inking mechanism comprising in combination composition rollers including upper distributing rollers and lower form rollers at the respective sides of said distributing rollers, a frame in which said rollers are journaled, a pivoted frame pivoted at one of its ends to said last-named frame, lower distributing rollers at the respective ends of said pivoted frame coacting with said respective form rollers, and an upper distributing roller in said pivoted frame coacting with said first-named upper distributing rollers, said distributing rollers in said pivoted frame spaced apart laterally, said first-named upper distributing rollers received in the spaces between said distributing rollers in said pivoted frame, and arranged whereby said distributing rollers in said pivoted frame move in arcuate paths with relation to said composition rollers.

21. In a printing machine, an inking mechanism comprising in combination composition rollers including upper distributing rollers and lower form rollers at the respective sides of said distributing rollers, a frame in which said rollers are journaled, a pivoted frame pivoted at one of its ends to said last-named frame, lower distributing rollers at the respective ends of said pivoted frame coacting with said respective form rollers, and an upper distributing roller in said pivoted frame coacting with said first-named upper distributing rollers, said distributing rollers in said pivoted frame spaced apart laterally, said first-named upper distributing rollers received in the spaces between said distributing rollers in said pivoted frame, the pivot of said pivoted frame being located at approximately the level of contact between said composition distributing rollers and said pair of distributing rollers in said pivoted frame, and arranged whereby said distributing rollers in said pivoted frame move in arcuate paths with relation to said composition rollers.

22. In a printing machine, an inking mechanism comprising in combination a frame, composition rollers including upper distributing rollers and lower form rollers at the respective sides of said distributing rollers, bearings in said frame for said form rollers, bearing arms in which said distributing rollers are journaled, means pivoting said bearing arms to said frame whereby lateral movement of said distributing rollers is permitted, a pivoted frame pivoted at one of its ends to said last-named frame, lower distributing rollers at the respective ends of said pivoted frame coacting with said respective form rollers, and an upper distributing roller in said pivoted frame coacting with said first-named upper distributing rollers, said distributing rollers in said pivoted frame spaced apart laterally, and said pivoted bearing arms permitting automatic lateral adjustment of said first-named upper distributing rollers in the spaces between said distributing rollers in said pivoted frame.

23. In a printing machine, an inking mechanism comprising in combination an inker frame including a relatively stationary frame and a pivoted frame pivoted together at one of the ends of said frames, spaced apart composition distributing rollers pivoted in said relatively stationary frame, composition form rollers having spaces therebetween and arranged in pairs at the respective sides of and spaced from said composition distributing rollers, said composition distributing rollers being farther removed from the form than said form rollers, and relatively hard distributing rollers journaled in said pivoted frame and having spaces therebetween, said composition distributing rollers received in said spaces, and said relatively hard distributing rollers received in the spaces respectively between said composition distributing rollers and said form rollers, the pivoting of said composition distributing rollers permitting yield of said composition distributing rollers for the passage of said relatively hard distributing rollers and automatic shifting of said composition distributing rollers for proper contact relation with said relatively hard distributing rollers in said pivoted frame.

24. In a printing machine, an inking mechanism comprising in combination an inker frame including a relatively stationary frame and a pivoted frame, means pivoting said frames together at one of their ends, composition distributing rollers and composition form rollers journaled in said relatively stationary frame and arranged with spaces between said composition distributing rollers, between said form rollers, and between said composition distributing rollers and said form rollers, relatively hard distributing rollers journaled in said pivoted frame having spaces therebetween and arranged to be received in said first-named spaces, said composition distributing rollers received in said spaces between said relatively hard distributing rollers, for inking coaction between said rollers, and wedge clamping means and stops between the opposite ends of said frames for definite coacting relation between said inking rollers.

25. In a printing machine, an inking mechanism comprising a relatively stationary frame, a pivoted frame, means pivoting said pivoted frame on said relatively stationary frame, inking rollers in said respective frames coacting with each other, means for adjusting inking rollers in said relatively stationary frame, operating means therefor in said pivoted frame, a releasable connection between said operating means and said adjusting means comprising a pair of coacting parts, and resilient means urging coaction between said coacting parts, and arranged whereby said coacting parts are separated upon separating movement between said frames, whereby said coacting parts are caused to approach by approaching movement between said frames, and permitting yield between said coacting parts upon such approaching movement when said coacting parts are out of coactive relation, and whereby said coacting parts are brought into coactive relation by operation of said operating means.

26. In a printing machine, an inking mechanism comprising a relatively stationary frame, a pivoted frame, means pivoting said pivoted frame on said relatively stationary frame, inking rollers in said respective frames coacting with each other, means for adjusting inking rollers in said relatively stationary frame, operating means therefor in said pivoted frame, a releasable connection between said operating means and said adjusting means comprising a pair of meshing pinions, one of said pinions mounted in each of said frames, and resilient means urging coaction between said pinions and arranged whereby said pinions are separated upon separating movement between said frames, whereby said coacting pinions are caused to approach by approaching movement between said frames and permitting yield between said pinions upon such approaching movement when the teeth of said pinions are out of coactive relation, and whereby said teeth are brought into mating relation by operation of said operating means.

27. In a printing machine, the combination of a pair of inking rollers provided with axles, upwardly extending unbalanced bearing arms provided with bearings for said axles and with pivots under said axles, coacting inking rollers having spaces therebetween in which said first-named inking rollers are received and automatically positioned by contact between said inking rollers, and means limiting lateral unbalanced movements of said first-named inking rollers.

28. In a printing machine, the combination of a pair of inking rollers provided with axles, pivoted bearing arms for said axles provided with bearings and with pivots under said bearings, a support to which said bearing arms are pivoted, and means for adjusting said support, said support provided with stops limiting lateral movements of said pivoted bearing arms on their pivots.

29. In a printing machine, the combination of a pair of inking rollers provided with axles, a pair of pivoted bearing arms in which said axles are journaled, a pivoted support to which said bearing arms are pivoted, coacting inking rollers, means for adjusting the pivot of said support toward and from said coacting inking rollers, and means for limiting the pivotal movements of said bearing arms and said pivoted support.

30. In a printing machine, the combination of a pair of inking rollers, pivoted bearing arms in which the same are journaled, a pivoted support to which said bearing arms are pivoted, coacting inking rollers, means for adjusting the pivot of said support with relation to said coacting inking rollers, a guiding face for said pivoted support, and resilient means urging said pivoted support toward said guiding face.

31. In a printing machine, the combination of a pair of inking rollers, pivoted bearing arms in which the same are journaled, a pivoted support to which said bearing arms are pivoted, coacting inking rollers, means for adjusting the pivot of said support with relation to said coacting inking rollers, a guiding face for said pivoted support, resilient means urging said pivoted support toward said guiding face, and means limiting pivotal movements of said bearing arms and of said pivoted support.

32. In a printing machine, the combination of a pair of inking rollers provided with axles, pivoted bearing arms provided with bearings for said axles and with pivots under said bearings, a support to which said bearing arms are pivoted, said support provided with stops limiting lateral movements of said pivoted bearing arms on their pivots, means for pivoting said support, adjusting means for raising and lowering said last-named pivot, and a central stop, said pivoted support provided with contact faces coacting with said central stop for limiting lateral movements of said pivoted support.

33. In a printing machine, the combination of a pair of inking rollers provided with axles, pivoted bearing arms provided with bearings for said axles and with pivots under said bearings, a slide to which said bearing arms are pivoted, said slide provided with stops limiting lateral movements of said pivoted bearing arms on their pivots, a pivot for said slide, adjusting means for raising and lowering said last-named pivot, a central stop, said pivoted slide provided with contact faces coacting with said stop for limiting lateral movements of said pivoted slide, and a spring about said last-named pivot urging said slide toward its sliding face.

34. In a printing machine, the combination of a relatively hard distributing roller, a pair of relatively hard distributing rollers between and out of plane with said first-named distributing roller for forming a cavity therebetween, said distributing rollers having spaces therebetween, a pair composition distributing rollers in said cavity and extending into said spaces, and pivoted bearing arms in said cavity for said composition distributing rollers, said pivoted bearing arms provided with pivots at their inner ends whereby lateral movements are permitted said composition distributing rollers for equal contact thereof in said spaces with said first-named distributing rollers at the respective sides of said spaces.

35. In a printing machine, the combination of a pair of relatively hard distributing rollers, a relatively hard distributing roller between and out of plane with said first-named distributing rollers for forming a cavity between said distributing rollers, said distributing rollers having spaces therebetween, a pair of composition distributing rollers in said cavity and extending into said spaces, pivoted bearing arms in said cavity for said composition distributing rollers, said pivoted bearing arms provided with pivots at their inner ends, and a pivoted support to which said pivoted bearing arms are pivoted, whereby lateral movements are permitted said pivoted support and said pivoted bearing arms for equal contact of said composition distributing rollers in said spaces with the first-named distributing rollers at the respective sides of said spaces.

36. In a printing machine, the combination of three relatively hard distributing rollers having axes of rotation arranged in triangular relation, said distributing rollers having spaces therebetween, a pair of composition distributing rollers in said spaces, a pair of pivoted bearing arms in which said last-named rollers are journaled, and a pivoted support to which the inner ends of said bearing arms are pivoted, said bearing arms being rockingly pivoted to said support which latter is pivoted pendulumwise, whereby lateral movement is permitted said composition distributing rollers for equal contact thereof in said spaces with said first-named distributing rollers.

37. In a printing machine, the combination of three relatively hard distributing rollers having axes of rotation arranged in triangular relation, said distributing rollers having spaces therebetween, a pair of composition distributing rollers in said spaces, a pair of pivoted bearing arms in which said last-named rollers are journaled, a pivoted support to which the inner ends of said bearing arms are pivoted, said bearing arms being rockingly pivoted to said support which latter is pivoted pendulumwise, means limiting the pivotal movements of said bearing arms, and means limiting the pivotal movements of said support, and constructed and arranged whereby lateral movements are permitted said composition distributing rollers for equal contact thereof in said spaces with said first-named distributing rollers.

38. In a printing machine, the combination of an endwise reciprocating ink receiving roller, a fountain roller, a ductor roller, a rock-shaft, bearing arms thereon for said ductor roller, an actuating arm extending from said rock-shaft, an eccentric mounted about said rock-shaft, a reciprocating arm operated thereby, a rocker lever having operative connections with said reciprocating arm and with said endwise reciprocating ink receiving roller, a rotary part, and an actuating part mounted eccentrically thereon coacting with said actuating arm.

39. In a printing machine, the combination of an endwise reciprocating ink receiving roller, a fountain roller, a ductor roller, a rock-shaft, bearing arms thereon for said ductor roller, an actuating arm extending from said rock-shaft, an eccentric mounted about said rock-shaft, a reciprocating arm operated thereby, a rocker lever having operative connections with said reciprocating arm and with said endwise reciprocating ink receiving roller, an intermittently actuating lever for rotating said fountain roller, said lever comprising an actuating arm arranged in crosswise relation with said first-named actuating arm, a rotary part, and operating parts mounted eccentrically thereon in different angular relations with each other for actuating said actuating arms.

40. In a printing machine, the combination of an endwise reciprocating ink receiving roller, a fountain roller, an ink distributing roller, said rollers arranged in triangular relation, a ductor roller, a rock-shaft within said triangle, bearing arms thereon for said ductor roller, an actuating arm extending from said rock-shaft, an operating lever for rotating said fountain roller, said actuating lever comprising an actuating arm in cross-wise relation with said first-named actuating arm, a rotary part between said actuating arms journaled about the axis of said distributing roller, actuating parts eccentrically mounted thereon in different angular relations and coacting with said respective actuating arms, an eccentric rotatable about the axis of said rock shaft, a reciprocating arm actuated thereby, and a rocker lever having operative connection with said reciprocating arm and with said endwise reciprocating ink receiving roller.

41. In a printing machine, the combination of a pair of form rollers provided with axles, bearing blocks in which said axles are journaled, an adjusting screw connecting said bearing blocks for adjusting the distance between them, resilient means acting counter to said adjusting screw, and clamping means for said bearing blocks for clamping said bearing blocks in adjusted positions.

42. In a printing machine, the combination of a distributing roller, a pair of form rollers coacting with said distributing roller, a pair of pivoted bearing blocks in which said form rollers are journaled, a pair of slides to which said bearing blocks are pivoted, an adjusting screw between said slides for adjusting the distance between them, resilient means acting on said pivoted bearing blocks urging said form rollers toward said distributing roller, and arranged whereby adjustment of distance between said slides causes movement of said form rollers by said distributing roller toward and from the path of the form.

43. In a printing machine, the combination of a distributing roller, a pair of form rollers coacting with said distributing roller, a pair of pivoted bearing blocks in which said form rollers are journaled, a pair of slides to which said bearing blocks are pivoted, a guideway for said slides, an adjusting screw between said slides for adjusting the distance between them, resilient means acting on said pivoted bearing blocks urging said form rollers toward said distributing roller, and arranged whereby adjustment of distance between said slides causes movement of said form rollers by said distributing rollers toward and from the path of the form, and clamping means connecting said respective pivoted bearing blocks and slides and the wall of said guideway for clamping said parts in adjusted positions.

44. In a printing machine, the combination of a pair of form rollers, a slide for each of said form rollers, guiding means for each of said slides, a bearing block for each of said slides, a clamp-stud for each of said slides for pivoting its bearing block to said slide, each of said clamp-studs provided with a threaded shank, a wall of said guiding means provided with slots for said shanks, an adjusting screw having threaded connection with one of said slides and journaled in the other of said slides, said adjusting screw provided with a shoulder for said other of said slides, each of said clamp-studs provided with a hole through which said adjusting screw passes, and a spring between said bearing blocks urging approach between said shoulder and the bearing block with which it coacts, and clamp nuts for said threaded shanks for clamping said respective bearing blocks and slides in adjusted positions.

In testimony whereof, I have hereunto signed my name.

LESLIE W. CLAYBOURN.